US007030205B2

(12) United States Patent
Foster, Jr. et al.

(10) Patent No.: US 7,030,205 B2
(45) Date of Patent: Apr. 18, 2006

(54) POLYDITHIOCARBAMATE RESIN

(75) Inventors: Alvie L. Foster, Jr., Chattanooga, TN (US); Ivonne C. Weidner, Hixson, TN (US); Maurice R. Smith, Cleveland, TN (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 0 days.

(21) Appl. No.: 09/970,755

(22) Filed: Oct. 4, 2001

(65) Prior Publication Data

US 2003/0083456 A1    May 1, 2003

(51) Int. Cl.
*C08G 18/38* (2006.01)
*C08G 18/28* (2006.01)

(52) U.S. Cl. .................. 528/68; 210/660; 210/666; 210/679; 210/681; 528/49; 528/71; 558/235; 558/236; 558/237

(58) Field of Classification Search ............... 210/679, 210/681, 660, 666; 528/49, 68, 71; 558/235, 558/236, 237
See application file for complete search history.

(56) References Cited

U.S. PATENT DOCUMENTS

| 4,391,945 A | 7/1983 | Mashio et al. .............. 524/600 |
| 4,518,760 A | 5/1985 | Smith et al. .................. 528/48 |
| 4,578,195 A | 3/1986 | Moore et al. ............... 210/679 |
| 5,695,882 A | 12/1997 | Rosenberg et al. .......... 428/405 |
| 5,997,748 A | 12/1999 | Rosenberg et al. ......... 210/688 |
| 6,063,286 A | 5/2000 | Steuerle et al. ............. 210/688 |
| 6,153,795 A | 11/2000 | Bicak .......................... 564/84 |

FOREIGN PATENT DOCUMENTS

WO    WO 98/11066    3/1998

OTHER PUBLICATIONS

Miyazaki, Akira and Barnes, Ramom M., "Differential Determination of Chromium (VI) —Chromium (III) with Poly(dithiocarbamate) Chelating Resin and Inductively Coupled Plasma —Atomic Emission Spectrometry", Anal. Chem. 1981, 53, 364-366.

Miyazaki, Akira and Barnes, Ramom, M., "Complexation of Some Transition Metals, Rare Earth Elements, and Thorium with a Poly(dithiocarbamate) Chelating Resin", Anal. Chem. 1981, 53, 299-304.

Horvath, Zs. And Barnes, Ramon, M., "Characterization of Functional Group Complexation of a Poly(dithiocarbamate) Chelating Resin", Anal. Chem. 1986, 58, 725-727.

*Primary Examiner*—Rabon Sergent
(74) *Attorney, Agent, or Firm*—David P. LeCroy

(57) ABSTRACT

The present invention is directed to a solid chelating resin consisting of a reactive hydrophobic backbone having pendent carbodithioic groups. Preferably the resin is a poly(dithiocarbamate) containing no tertiary nitrogen groups. The invention is also directed to a novel process for making a chelating resin involving a) reacting a nucleophilic compound with carbon disulfide in a suitable solvent, to form a carbodithioic acid, b) neutralizing the carbodithioic acid with a base to form a carbodithioic acid salt; and c) reacting said carbodithioic acid salt with a crosslinking reagent in a suitable solvent to form a solid chelating resin. The chelating resin is useful in removing metals and cationic compounds from effluent streams.

8 Claims, No Drawings

POLYDITHIOCARBAMATE RESIN

FIELD OF THE INVENTION

This invention relates to solid chelating resins having a reactive hydrophobic backbone and pendent carbodithioic groups. An example of such resins is a poly(dithiocarbamate) (PDTC) resin, useful in the removal of metals and cationic entities from effluent streams in an effective and efficient manner. Specifically, the PDTC resins and resin compositions of the present invention are capable of handling high through-put of effluent streams in a manner efficient to remove contaminants to desired low levels.

BACKGROUND OF THE INVENTION

Trace amounts of metals and other contaminants may be found in effluent streams from many industrial processes. Recovery of these metals and other elements from the effluent stream is an economic concern—both in reclaiming the metals and as a means of cleaning effluent streams to avoid pollution and to comply with environmental regulations. Regulations are expected to require removal of many metals to part per billion (ppb) levels. There is a need for a system that is capable of removing metals from an effluent stream in an effective and efficient manner.

It is known that poly(dithiocarbamate) (PDTC) resins are effective as chelated ion exchangers for the separation and concentration of metals and other compounds. It has been shown that more than 50 elements complex with a PDTC resin. Mlyazaki, A. and Barnes, R. "Complexation of Some Transition metals, rare Earth Elements, and Thorium with a Poly(dithiocarbamate) Chelating Resin", Anal. Chemistry, vol. 53, (1981), pp. 299–304.

U.S. Pat. No. 4,518,760 describes the preparation of a polydithiocarbamate resin useful in removing heavy metals and other ions from aqueous solutions. U.S. Pat. No. 4,578,195 describes a process for purifying effluents and purge streams containing trace element, using a polydithiocarbamate resin having a sulfur content of from 6 to 7 percent.

One problem with the PDTC resins of the prior art is that the amount of effluent that can be passed though the resin, and still achieve acceptable removal of cationic contaminants, is unacceptably low for use in many industrial processes.

Surprisingly it has been found that polydithiocarbamate resins made by a novel process, and PDTC composites, are capable of handling high throughputs of effluent, while removing metals to desired parts per billion (ppb) levels.

SUMMARY OF THE INVENTION

The present invention is directed to a solid chelating resin comprising a reactive hydrophobic backbone and pendent carbodithioic groups. Since these resins are formed using reagents differentiated from previous art, moieties that do not contribute to the resin's chelating functionality are substantially reduced or absent. An example would be that, in the case of a (poly)dithiocarbamate resin, there are no tertiary amine groups present as in all polyethylene imine-based technology.

In a second embodiment, the present invention is directed to a process for producing a polydithiocarbamate resin by reacting a nucleophilic compound with carbon disulfide, then crosslinking the dithiocarbamate to form a polydithiocarbamate solid resin.

In a third embodiment, the present invention is directed to a process for removing contaminants from an effluent stream by contacting the effluent stream with the polydithiocarbamate resins of the present invention.

DETAILED DESCRIPTION OF THE INVENTION

The present invention relates to a solid chelating resin comprising a reactive hydrophobic backbone and having pendent carbodithioic functional groups. The most preferred of the carbodithioic chelating resins is a (poly)dithiocarbamate resin.

By solid, as used herein, is meant any substance that is ordered, cohesive, and insoluble to the effluent stream that it will come in contact with. It is critical that the resin possesses a structure that will allow an effluent stream to pass through without altering the integrity or composition of the resin. The physical appearance of the invention may be any form usually associated with a "solid," such as crystalline, granular, spongy, amorphous, etc. and does not exclude semi-solids such as gels or suspensions. Solid resins of the present invention are formed via reactions involving crosslinking reagents and reactive sites on the (poly)carbodithioic intermediate.

By chelating resin, as used herein, is meant any substance that will form ionic, covalent, or coordinate covalent bonds with suspended or dissolved cationic species in an effluent stream. The resulting "complexes" may be cationic, anionic, or neutral, although they will generally be neutral species. While the cationic species will usually be a metal ion, the invention would be effective at chelating other cationic species, such as complexes, chelated metals, some non-metallic cations, and highly polarized neutral species.

The solid chelating resin of the present invention is composed of a reactive hydrophobic backbone having pendent carbodithioic groups. By reactive hydrophobe or reactive hydrophobic, as used herein, is meant a hydrocarbon chain or modified hydrocarbon chain having a reactive chemical functional group. Preferably the reactive hydrophobic group is a nucleophilic group. The reactive hydrophobic backbone contains at least one C, N, O, P or S moiety, or a combination thereof. Examples of reactive hydrophobic backbones of the present invention include, but are not limited to:

Aromatic, aliphatic, or mixed amines, diamines, multiamines;

Aromatic, aliphatic, or mixed alcohols, or diols;

Aromatic, aliphatic, or mixed reactive carbon species, such as carbanions or methylene malonic ester groups;

Aromatic, aliphatic, or mixed mono-, di-, or trialkyl phosphites, or diphosphites;

Aromatic, aliphatic, or mixed mono-, di-, or trialkylphosphines, or diphosphines;

Aromatic, aliphatic, or mixed nucleophilic sulfur species, such as sulfides and sulfoxides; And linear polyamines (meaning any polyamine not containing tertiary amine groups), polyols, polyphosphites, polyphosphines.

Included are compounds comprising mixtures of the above hydrophobic groups, such as amino alcohols or polyethylene glycol.

The preferred reactive hydrophobic species would be selected from the group consisting of diamines, multiamines, and diols. The most preferred reactive hydrophobic species would be selected from the list consisting of hexamethylenediamine (HMDA), diethylenetriamine (DETA), triethylenetetramine (TETA), and tetraethylenepentamine (PETA).

The reactive hydrophobic backbone of the solid chelating resin contains pendent carbodithioic groups. The carbodithioic groups are sulfur analogs to carboxylic acid, in free or neutralized form as a result of the reaction between a C, N, O, P, or S functionality and $CS_2$. The carbodithioic functional groups could be contained within such functionalities commonly referred to as thiocarboxylic acids, dithiocarbamic acids, dithiocarbamates, xanthates, phosphodithiocarbamic acids, and trithiocarbonates.

While the chelating resin functions prior to crosslinking, the solid resin character of the present invention is generally imparted by the inclusion of a crosslinking reagent that combines with residual reactive sites on the (poly)carbodithioic intermediate. The crosslinking reagent will combine with the reactive sites to form linkages commonly referred to as alkylenes, amines, ethers, phosphines, sulfides, amides, ureas, urethanes, phosphoamidates, and thioamidates. Preferably the crosslinking reagent is a hydrophobic reagent. The crosslinking reagent could be in any physical form and can exist as a monomeric or polymeric entity. Suitable crosslinking reagents include, but are not limited to, the following chemistries, or mixtures thereof:

a) Aromatic, aliphatic, or mixed hydrocarbons bearing at least two facile synthetic leaving groups, such as halides, hydroxides, amines, sulfides, alkoxides, alkylsiloxanes, carbonates, sulfates, phosphates, or any other generally accepted synthetic leaving groups. Aromatic, aliphatic, or mixed hydrocarbons bearing at least two electrophilic functional groups facile to nucleophilic acyl substitution/addition, such as carboxylic acids, carboxylic acid halides, carboxylic esters, carboxylic anhydrides, carboxylic amides, carboxylic imides, phosphonic acids, phosphonate esters, phosphorohalonates, phosphonic anhydrides, phosphonamides, phosphonimides, phosphinic acids, phosphinic esters, phosphinic acid halides, phosphinic anhydrides, phosphinamides, phosphinimides, sulfonic acids, sulfonate esters, sulfonyl halides, sulfonyl anhydrides, sulfonamides, sulfonimides, sulfinic acids, sulfinyl esters, sulfinyl halides, sulfinyl anhydrides, sulfinamides, sulfinimides, sulfamic acids, sulfuryl halides, sulfones, sultones, thiocarboxylic acids, thiocarboxylic esters, thiocarboxylic acid chlorides, thiocarboxylic anhydrides, aldehydes, ketones, imines, nitriles, epoxides, guanidines, cyanates, isocyanates, thiocyanates, and isothiocyanates.

Preferred crosslinking reagents are selected from the group consisting of carboxylic acid halides, carboxylic esters, carboxylic anhydrides, sulfonyl halides, sulfonate esters, sulfonyl anhydrides, nitriles, and isocyanates. The most preferred crosslinking reagents are selected from the group consisting of 4,4'-methylenebis (phenyl isocyanate) (MDI), polymeric MDI or polymethylene polyphenyl isocyanate (PAPI), tolylene 2,4, diisocyanate (TDI), isophorone diisocyanate (IPDI), terephthalic acid and its analogs, and adipic acid and its analogs.

The invention is also directed to a novel process for producing solid chelating resins involving reacting a suitable nucleophilic species with carbon disulfide in an appropriate solvent, followed by neutralization of the resulting carbodithioic acid with a suitable base, then further reacting the carbodithioic acid salt with a chosen crosslinking reagent to form a solid chelating resin. The process may be continuous, batch, semi-batch, or stepwise.

The process produces unique molecular constructions that give resins with high chelating capacities in excellent overall yield. Another advantage of crosslinking after the dithiocarbamate functionality has formed is that the crosslinker level can be adjusted to control the physical properties of the resin. A low level of cross-linking can form a softer, spongy polymer, while a high level of cross-linking will produce a very hard resin.

The reactive species useful in the present invention include aromatic, aliphatic, or mixed amines, diamines, multiamines; aromatic, aliphatic, or mixed alcohols, or diols; aromatic, aliphatic, or mixed nucleophilic carbon species, such as carbanions or methylene malonic ester groups; aromatic, aliphatic, or mixed mono-, di-, or trialkyl phosphites, or diphosphites; and aromatic, aliphatic, or mixed mono-, di-, or trialkylphosphines, or diphosphines; aromatic, aliphatic, or mixed nucleophilic sulfur species, such as sulfides and sulfoxides; polyamines, polyols, polyphosphites, and polyphosphines. The preferred nucleophilic species also include polyamines and polyols, with a most preferred species also being polyethyleneimine (PEI) polyamines. Polyamines for use in the invention have a molecular weight between 800 and 2,000,000, preferably 1300 to 25,000, most preferably 1300.

Carbon disulfide is added to the nucleophile in a molar ratio to nucleophilic sites of between 0.1 and 1.0, preferably 0.1 to 0.9, most preferably 0.3 to 0.7. If the level of $CS_2$ is too high, it can cause the polyamine to precipitate out, and can also make it harder to crosslink the dithiocarbamate in the subsequent step. Carbon disulfide is reacted with the nucleophilic reagent at a pH of between 7.0 and 13.0, and most preferably 10.5 to 12.5.

The carbodithioic acid is neutralized with a suitable base. Useful bases include ammonium hydroxide, sodium hydroxide, potassium hydroxide, or any other alkali or alkaline earth hydroxides, most preferably sodium hydroxide.

Useful solvents for the formation of the carbodithioic salt intermediate include water, tetrahydrofuran, methanol ethanol, isopropanol, acetone, acetonitrile, or other related solvent, preferably water Once the PDTC resin has formed, it can be cleaned and purified by any means known in the art, such as repeated washings with deionized water. The resin then can be ground to any desired particle size, based on the application.

The crosslinking reagent is added to the carbodithioic salt in the molar ratio of crosslinker to co-reagent functionality of between 0.1 and 0.9, preferably 0.3 to 0.7, most preferably 0.5.

Useful solvents for the formation of the (poly)carbodithioic resin are water, tetrahydrofuran, methanol ethanol, isopropanol, acetone, acetonitrile, or other related solvent, preferably water and THF.

Schemes I and II illustrate the preferable methods of forming the (poly)carbodithioic resins.

SCHEME I. Basic Diamine Process-Thiocarboxylation and Crosslinking

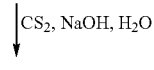

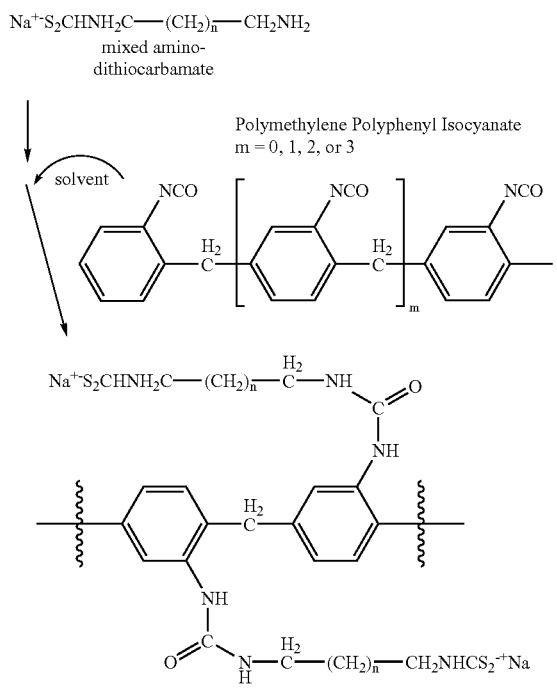

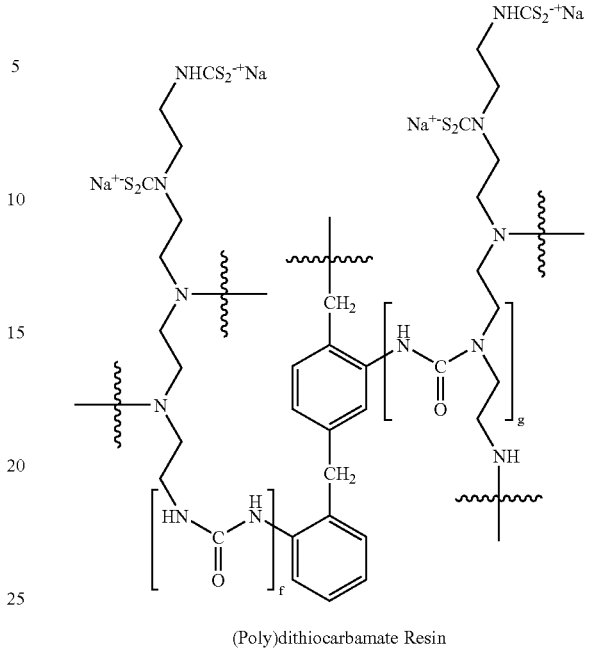

(Poly)dithiocarbamate Resin

It has been found to be advantageous to blend the solid chelating resin of the invention with an inert filter aid to produce the final product. The inert filter aid serves to facilitate flow of the aqueous effluent through filtration beds. The inert filter aid may be added either during or following the synthesis of the resin. Examples of fillers which may be used in the present invention include, but are not limited to, various grades and mesh sizes of diatomaceous earth, silicates, aluminates, carbonates, sand, charcoal, zeolites, molecular sieves, clays, glass beads, and inert organics. Preferred fillers are diatomaceous earth, sand and charcoal. Most preferably the filler is diatomaceous earth, such as Celite or Celatom products. The weight ratio of filler to resin can range from 0.10 to 0.90, preferably from 0.30 to 0.70, and most preferably from 0.40 to 0.60.

The chelating resins of the present invention are useful in removing metals and cationic contaminants from aqueous waste streams. The aqueous waste stream could be a purge stream, an effluent stream, or any other aqueous source containing trace contaminants. Removal of cationic metals occurs by contacting an aqueous stream containing cationic contaminants with the resin. The contact typically occurs in a filter housing, cartridge, packed cylinder, packed tower, layer systems, sediment pond, filtration bed, fixed bed, fluidized bed, or otherwise mixed with an aqueous system containing metal cations. The resin/cation complex can then be isolated and disposed of by means known in the art. The filter bed, cartridge media should meet local environmental standards, such as those established by the U.S. Environmental Protection Agency including the toxic characteristic leaching procedure (TCLP) standard for a non-hazardous waste.

The resins of the present invention can be used in a variety of applications, including the removal of cationic pollutants from industrial effluent streams, including, but not limited to cooling, boilers, metal plating, printed circuits, auto industry, metal working, paints, mining, agriculture, battery manufacture, chloralkali, metal finishing, mercury scrubbing, aerospace, marine, industrial/engine coolants and Polymeric Dithiocarbamate Resin SCHEME II. Polyamine Process-Thiocarboxylation and Crosslinking

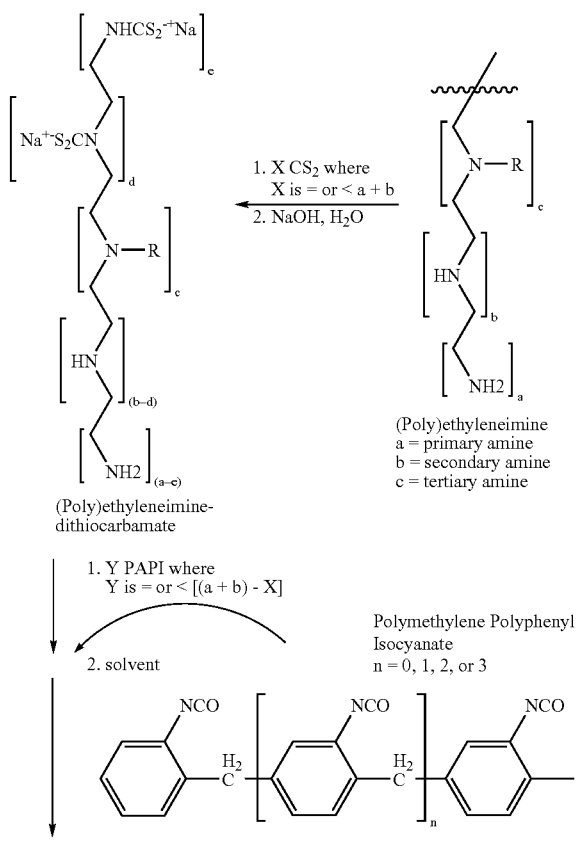

smelting. The resins are also useful in industrial processes including, but not limited to, metal working, recycled water, reverse osmosis pretreatment, electronics manufacture, ultrapure water, catalyst manufacturing, Nuclear waste disposal, photographic processes, and the recover of precious metals from industrial process streams. The resins are also useful in purification of municipal potable water, and treatment of waste water. Consumers can use the resins to purify well water and potable water, including third world sources. In the medical field the resin can be used to purify blood, in dialysis, and to treat lead and mercury poisoning. In non-aqueous applications the resin could be used to treat and decontaminate soil, and in recycling oil. These are only a few of the possible uses for the resin of the present invention, and one of skill in the art can imagine many other similar applications.

The resin is useful in the neat form, but could also be packaged in cylinders, flow-through packets, and cartridges that have the advantage of being removable and disposable without contact with the contaminated resin.

The PDTC resin is useful in removing mercury II ($Hg^{2+}$) from chlor-alkali waste streams. In experiments, the PDTC resin of the present invention removes mercury II to less than 15 parts per trillion (ppt).

EXAMPLES

This invention will be further clarified by use of the following examples, which are not intended to restrict the scope of the invention.

General Procedures:

Unless otherwise specified, the general methodologies described in this section apply to all of the following examples.

Air-drying of resins was accomplished by spreading the washed, crude solid on a bed of paper towels supported by a plastic tray. The wet solid was dispersed as widely as possible and left to dry at ambient temperature overnight. The product was either collected and weighed the following morning, or if indicated loaded into a round bottom flask and vacuum dried for 12–24 hours further before final weighing.

Resin capacity was quantified by adding a known mass of dried resin to a measured volume of a 500 ppm $Cu^{2+}$ standard solution. The resin was allowed to stir and mix with the copper solution for at least one hour, then a measured aliquot of the copper solution was filtered and analyzed for residual copper by flame AA.

Resin efficiency was quantified by packing a small plastic column with a known mass of resin. A 5 ppm $Cu^{2+}$ solution was then passed through the resin column using gravity filtration, and numerous 10 mL aliquots were collected. The aliquots were then analyzed by flame AA and the sample containing the minimum concentration of copper was used to determine efficiency.

Resin specific gravity was quantified by grinding a sample of the dried solid product to a fine powder using a mortar and pestle. A graduated cylinder, after taring on an analytical balance, was filled to the 10 mL mark with solid powder. Care was taken to tamp the solid down and ensure closest packing within the cylinder. The mass of the resin powder was then taken and divided by 10 to determine the density (i.e. specific gravity).

Example 1

The present example demonstrates a preparation of the invention resin performed at room temperature by the addition of 4.6 grams of carbon disulfide to a 26% aqueous solution of sodium Hexamethylene diamine which is comprising 4.8 grams of 50% sodium hydroxide and 11.6 grams of hexamethylenediamine. The intermediate formed is a mixed amino sodium hexamethylenedithiocarbamate.

In the second step a 45% solution of PAPI-94 (DOW) in tetrahydrofuran comprising 15.6 grams of PAPI-94 (polymethylene polyphenylisocyanate) was prepared and slowly added to the above dithiocarbamate solution with continuous agitation. The reaction product, an insoluble resin, was washed with 200 ml of deionized water, then air-dried and vacuum dried. Yield was 29.0 grams of yellowish solid with a specific gravity of 0.461 and a measured $Cu^{+2}$ capacity of 2.91 meq/gram resin.

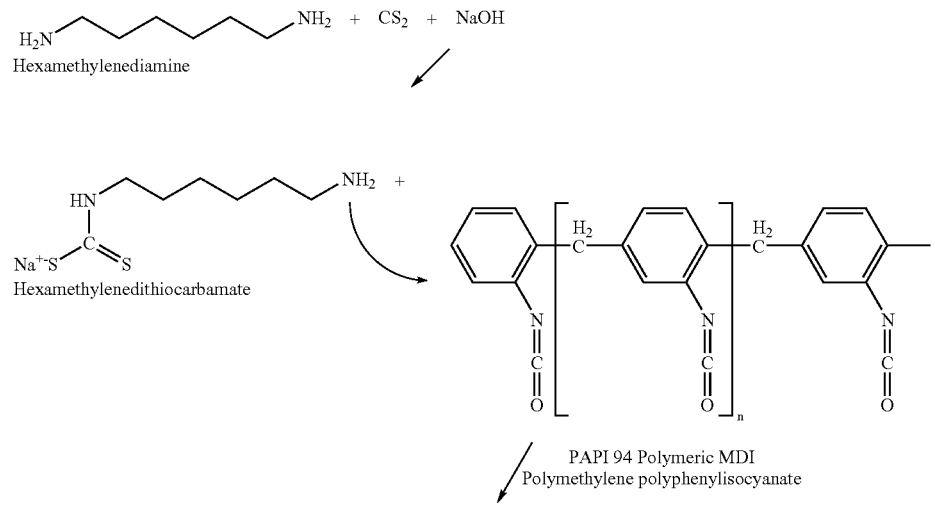

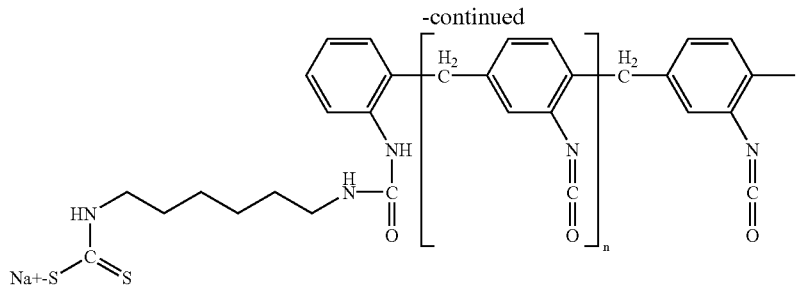

Example 2

The present example demonstrates a preparation of the invention resin performed at room temperature by the addition of 4.6 grams of carbon disulfide to a 26% aqueous solution of sodium Hexamethylene diamine which is comprising 4.8 grams of 50% sodium hydroxide and 11.6 grams of hexamethylenediamine. The intermediate formed is a mixed amino sodium hexamethylenedithiocarbamate.

In the second step a solution of tolylenediisocyanate (TDI) in tetrahydrofuran comprising 21.0 grams of TDI was prepared and slowly added to the above dithiocarbamate solution with continuous agitation. The reaction product, an insoluble resin, was washed with 200 ml of deionized water, then air-dried and vacuum dried. Yield was 28.7 grams of yellowish solid with a specific gravity of 0.392 and a measured $Cu^{+2}$ capacity of 0.23 meq/gram resin.

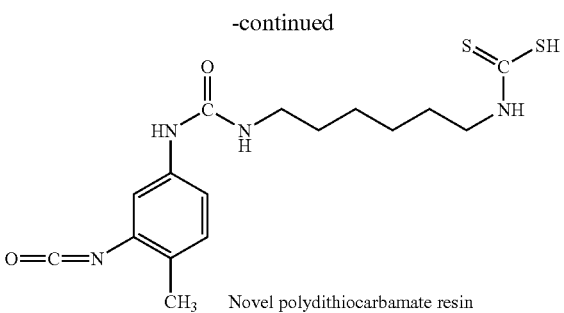

Novel polydithiocarbamate resin

Example 3

The present example demonstrates a preparation of the invention resin performed at room temperature by the addition of 6.1 grams of carbon disulfide to a 18% aqueous solution of sodium 2-methylpentamethylenediamine which is comprised of 6.4 grams of 50% sodium hydroxide and 11.7 grams of 2-methylpentamethylenediamine. The intermediate formed is a mixed amino sodium 2-methylpentamethylene dithiocarbamate.

In the second step a 45% solution of PAPI-94 in tetrahydrofuran comprising 15.6 grams of PAPI-94 (polymethylene polyphenylisocyanate) was prepared and slowly added to the above dithiocarbamate solution with continuous agitation. The reaction product, an insoluble resin, was washed with 200 ml of deionized water, then air-dried and vacuum dried. Yield was 33.2 grams of yellowish solid with a specific gravity of 0.094 and a measured $Cu^{+2}$ capacity of 0.42 meq/gram resin.

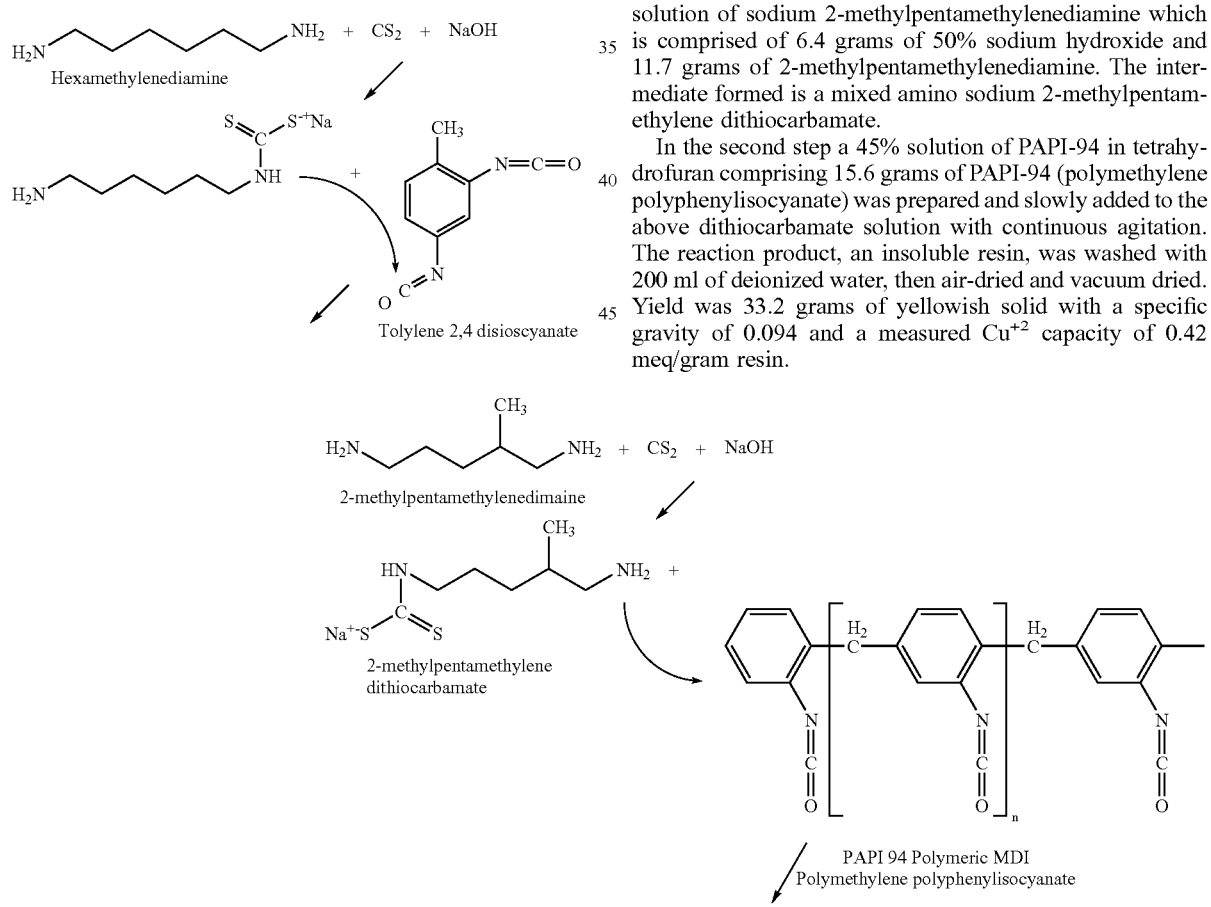

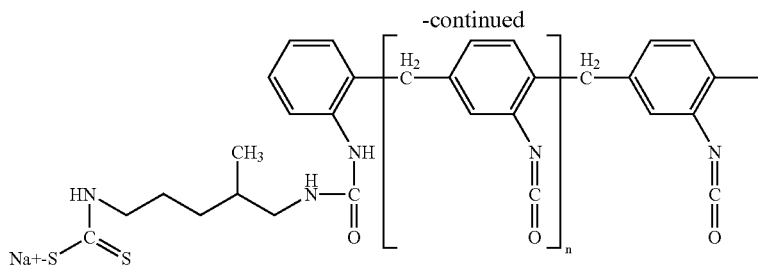

Example 4

The present example demonstrates a preparation of the invention resin performed at room temperature by the addition of 6.8 grams of carbon disulfide to a 26% aqueous solution of sodium bis-hexamethylenetriamine comprising 7.2 grams of 50% sodium hydroxide and 21.5 grams of bis-hexamethylenetriamine. The intermediate formed is a mixed amino sodium bis-hexamethylenetriamine dithiocarbamate.

In the second step a solution of tolylenediisocyanate (TDI) in acetone comprising 31.0 grams of TDI was prepared and slowly added to the above dithiocarbamate solution with continuous agitation. The reaction product, an insoluble resin, was washed with 200 ml of deionized water, then air-dried and vacuum dried. Yield was 56.5 grams of yellowish solid with a specific gravity of 0.430 and a measured $Cu^{+2}$ capacity of 0.40 meq/gram resin.

Example 5

The present example demonstrates a preparation of the invention resin performed at room temperature by the addition of 3.8 grams of carbon disulfide to a solution of sodium 1,4-phenylenediamine comprising 4.0 grams of 50% sodium hydroxide, 10.8 grams of 1,4-phenylenediamine, and 145 mL of tetrahydrofuran. The intermediate formed is a mixed amino sodium 1,4-phenylenediamine dithiocarbamate.

In the second step, 8.7 grams of neat tolylenediisocyanate (TDI) was slowly added to the above dithiocarbamate solution with continuous agitation. The reaction product, an insoluble resin, was washed with 200 ml of deionized water, then air-dried and vacuum dried. Yield was 7.4 grams of yellowish solid with a specific gravity of 0.544 and a measured $Cu^{+2}$ capacity of 2.09 meq/gram resin.

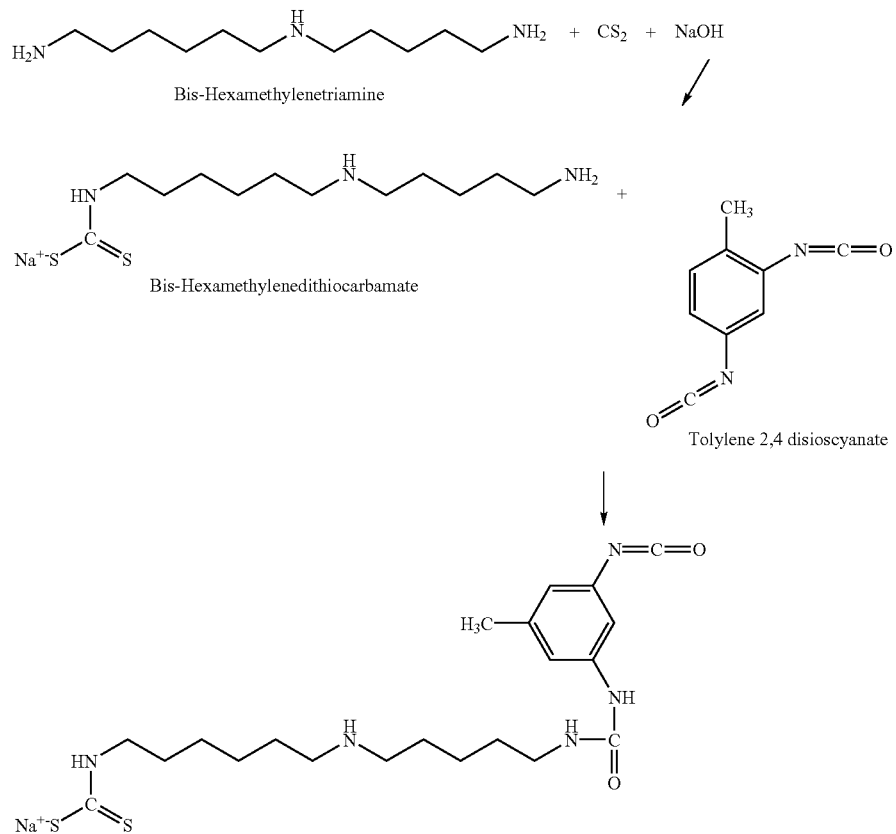

1,4 Phelylenediamine

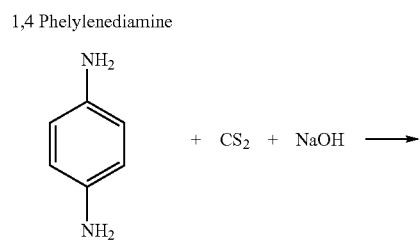

+ CS$_2$ + NaOH →

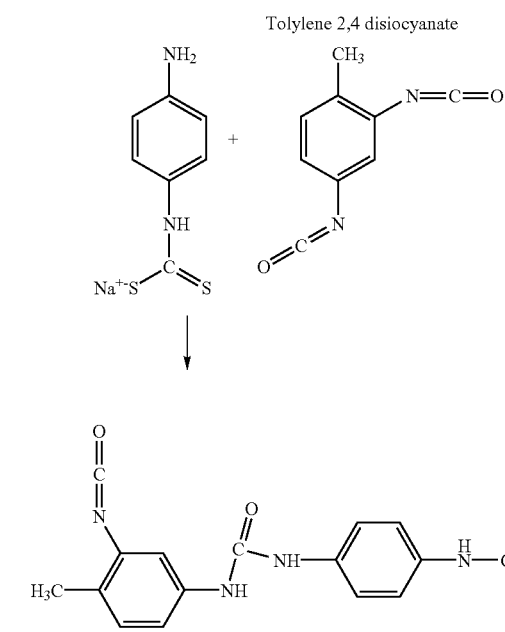

Example 6

The present example demonstrates a preparation of the invention resin performed at room temperature by the addition of 4.6 grams of carbon disulfide to a 19% mix aqueous solution of sodium tetraethylenepentamine (TEPA) comprising 4.8 grams of 50% sodium hydroxide and 18.6 grams of TEPA. The intermediate formed is a mixed amino sodium tetraethylenepentamine dithiocarbamate.

In the second step, 7.0 grams of neat tolylenediisocyanate (TDI) was slowly added to the above dithiocarbamate solution with continuous agitation. The reaction product, an insoluble resin, was washed with 200 ml of deionized water, then air-dried and vacuum dried. Yield was 3.5 grams of yellowish solid with a Cu$^{+2}$ capacity of 1.38 meq/gram resin.

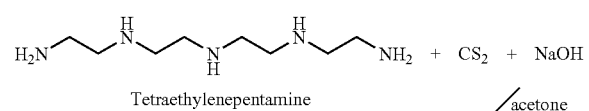

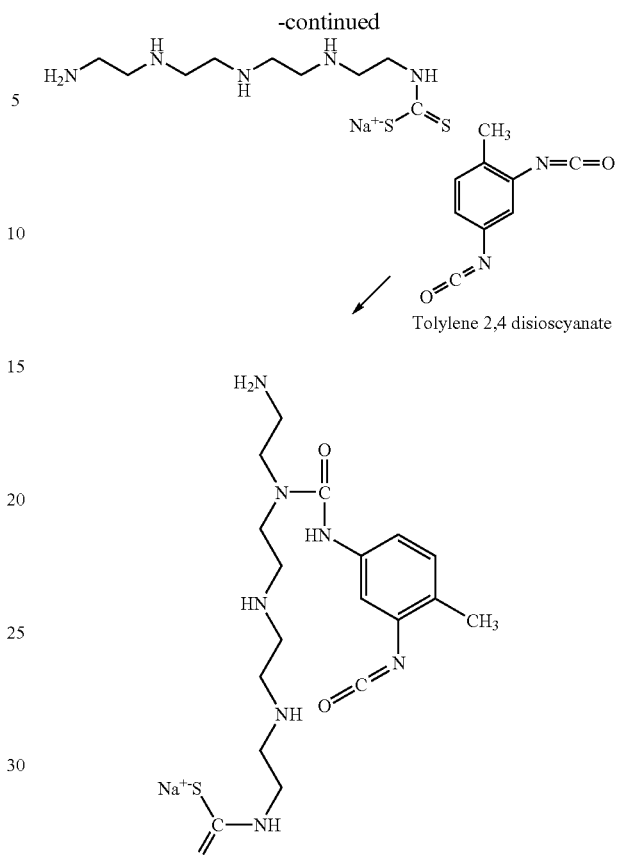

Example 7

The present example demonstrates a preparation of the invention resin performed at room temperature by the addition of 11.4 grams of carbon disulfide to a solution of sodium polyethyleneimine (LUPASOLI G-20, BASF) comprising 12.0 grams of 50% sodium hydroxide, 43.0 grams of polyethyleneimine, 400 mL tetrahydrofuran, and 40 ml water. The intermediate formed is a mixed amino sodium polyethyleneimine dithiocarbamate.

In the second step, 15.6 grams of neat PAPI-94 (polymethylene polyphenylisocyanate) was slowly added to the above dithiocarbamate solution with continuous agitation. The reaction product, an insoluble resin, was washed with 200 ml of deionized water, then air-dried and vacuum dried. Yield was 54.0 grams of yellowish solid with a Cu$^{+2}$ removal efficiency of 99.9% and a Cu$^{+2}$ capacity of 2.02 meq/gram resin.

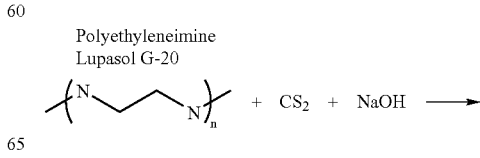

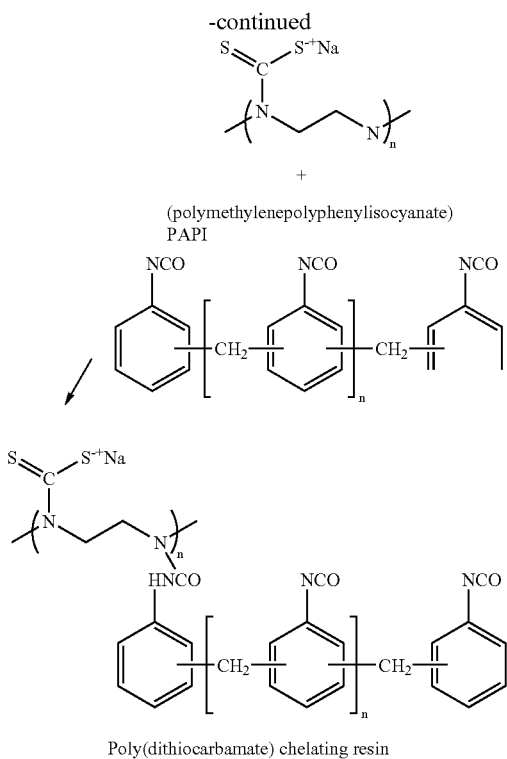

Poly(dithiocarbamate) chelating resin

Example 8

The present example demonstrates a preparation of the invention resin performed at room temperature by the addition of 7.6 grams of carbon disulfide to an aqueous solution of sodium tris-(aminoethyl)amine comprising 8.0 grams of 50% sodium hydroxide and 15.4 grams of tris-(aminoethyl)amine. The intermediate formed is a mixed amino sodium tris-(aminoethyl)amine sodium tris-(aminoethyl)amine dithiocarbamate.

In the second step a solution of PAPI-94 in tetrahydrofuran comprising 26.0 grams of PAPI-94 (polymethylene polyphenylisocyanate) was prepared and slowly added to the above dithiocarbamate solution with continuous agitation. The reaction product, an insoluble resin, was washed with 200 ml of deionized water, then air-dried and vacuum dried. Yield was 31.2 grams of yellowish solid with a $Cu^{+2}$ capacity of 0.13 meq/gram resin. In another experiment, a resin of similar composition showed a $Cu^{+2}$ removal efficiency of 99.0%.

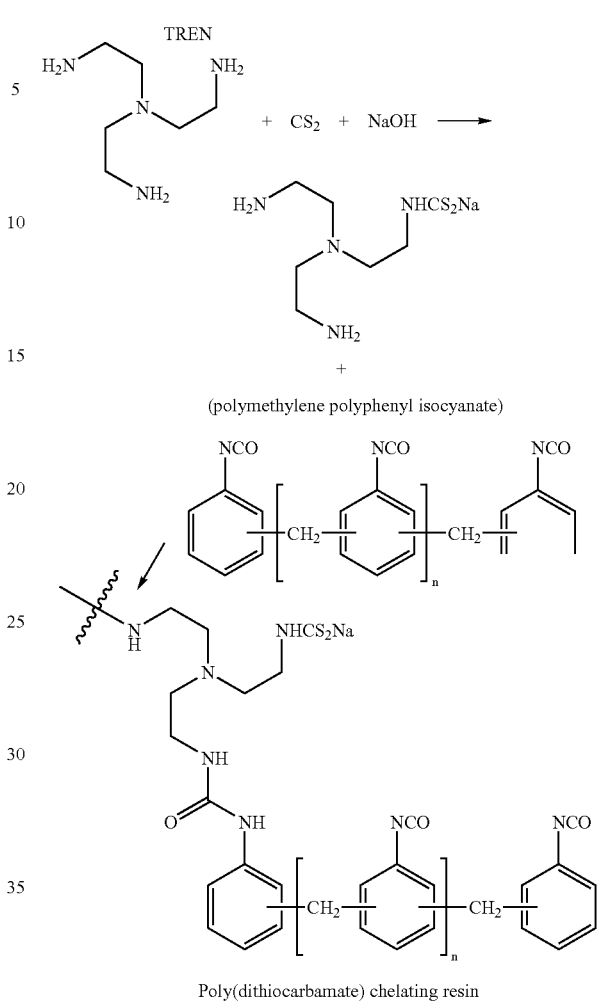

Poly(dithiocarbamate) chelating resin

Example 9

The present example demonstrates a preparation of the invention resin performed at room temperature by the addition of 11.47 grams of carbon disulfide to an aqueous solution of sodium polyethyleneimine (LUPASOL Lu-321) comprising 12.0 grams of 50% sodium hydroxide and 22.5 grams of polyethyleneimine (a linear polyethyleneimine). The intermediate formed is a mixed amino sodium polyethyleneimine dithiocarbamate.

In the second step, 39.0 grams of PAPI-94 (polymethylene polyphenylisocyanate) in tetrahydrofuran was slowly added to the above dithiocarbamate solution with continuous agitation. The reaction product, an insoluble resin, was washed with 200 ml of deionized water, then air-dried and vacuum dried. Yield was 43.2 grams of yellowish solid with a $Cu^{+2}$ removal efficiency of 99.9%.

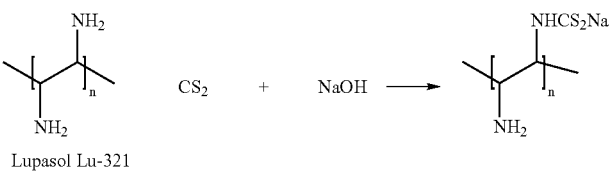

Lupasol Lu-321

+

-continued
(polymethylene polyphenyl isocyanate)

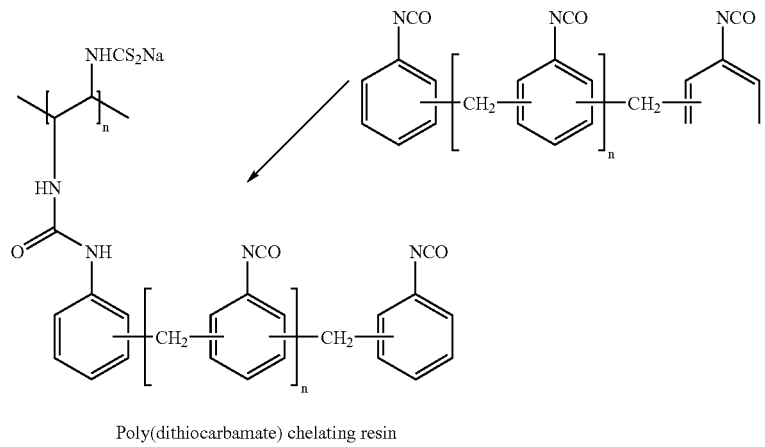

Poly(dithiocarbamate) chelating resin

Example 10

The purpose of the present example is to demonstrate that the invention resin will perform efficient metal removal in an alkaline environment. The resins from Examples 1 and 6 above, hereafter referred to as HMDA and TEPA resins respectively, were used in this example. A stock 5 ppm $Cu^{+2}$ solution was prepared and adjusted to approximately 10.5 with 0.1N NaOH. A stock solution of deionized water was also adjusted to a pH of approximately 10.5 using 0.1N NaOH. 1.0 gram of each resin was packed into small polyethylene columns, followed by rinsing with the stock deionized water until the effluent from each column was at a pH of approximately 10.5. The basic copper solution was then flowed through each resin sample, using gravity filtration and collecting 10 mL aliquots from each resin. The aliquot samples, as well as the copper stock solution, were analyzed by flame AA to determine the efficiency of $Cu^{+2}$ removal for each resin, with results as follows:

| HMDA resin: | 99.9% removal |
|---|---|
| TEPA resin: | 99.2% removal |

What is claimed is:

1. A process for producing a chelating resin comprising:
   reacting a nucleophilic compound with carbon disulfide in a solvent, to form a carbodithioic acid;
   neutralizing said carbodithioic acid with a base to form a carbodithioic acid salt; and
   reacting reactive sites on said carbodithioic acid salt with a crosslinking reagent in a solvent to form a solid chelating resin.

2. The process of claim 1 wherein said chelating resin comprises a (poly)dithiocarbamate resin.

3. The process of claim 1 wherein said nucleophilic compound comprises an amine.

4. The process of claim 3 wherein said amine comprises a polyamine.

5. The process of claim 4 wherein said polyamine comprises polyethyleneimine polyamine.

6. The process of claim 1 wherein the molar ratio of carbon disulfide to reactive nucleophilic sites is from 0.1:1.0 to 0.9:1.0.

7. The process of claim 6 wherein the molar ratio of carbon disulfide to reactive nucleophilic sites is from 0.3:1.0 to 0.7:1.0.

8. The process of claim 1, wherein said nucleophilic reaction occurs at a pH of from 7.0 to 13.0.

* * * * *